Aug. 7, 1962 K. A. DOUTT 3,048,354
AILERON CONTROL SYSTEM FOR AIRCRAFT
Filed Sept. 21, 1959 2 Sheets-Sheet 1

INVENTOR
KINGSLEY A. DOUTT

BY W. B. Harpman
ATTORNEY

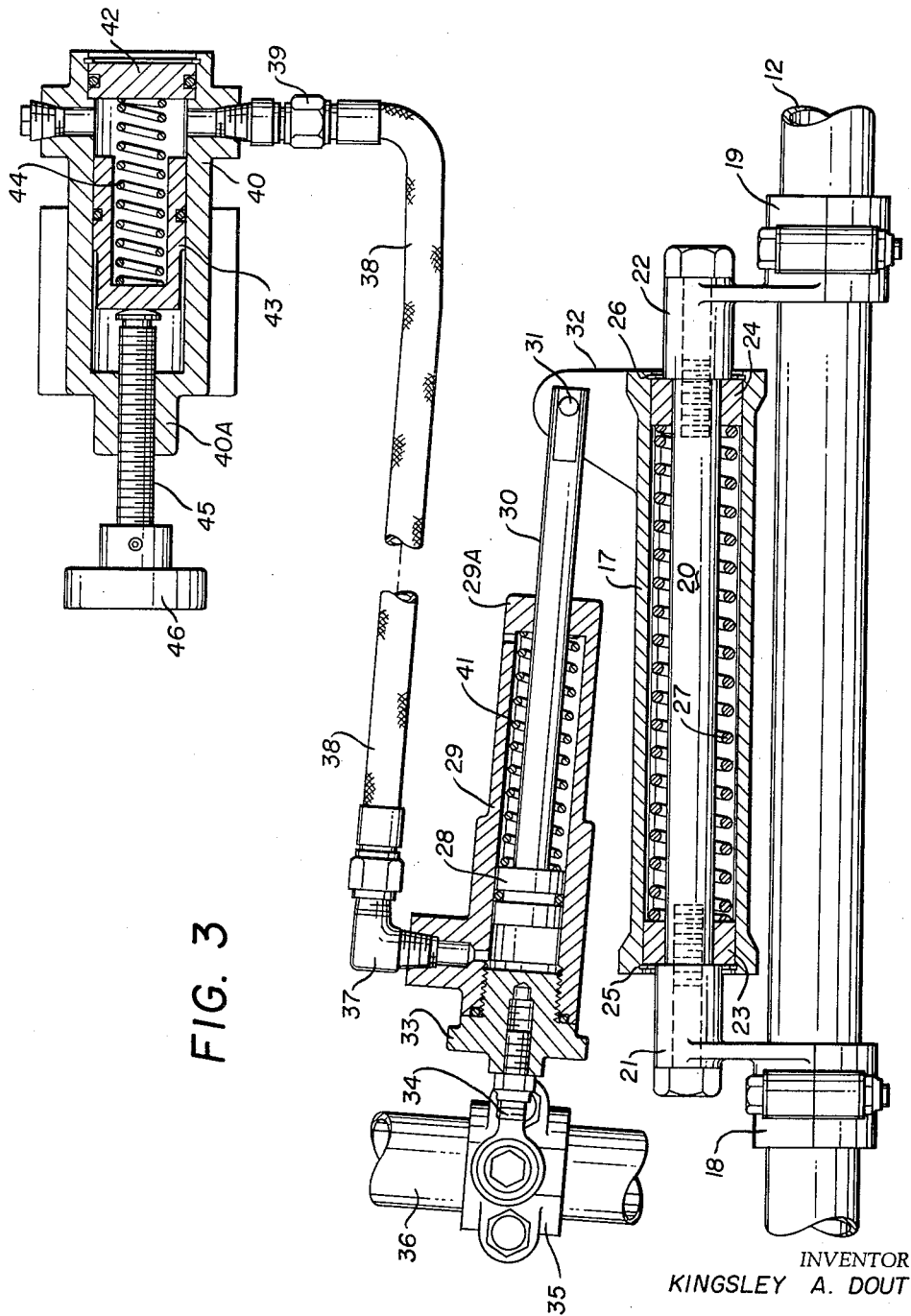

United States Patent Office 3,048,354
Patented Aug. 7, 1962

3,048,354
AILERON CONTROL SYSTEM FOR AIRCRAFT
Kingsley A. Doutt, Alpena, Mich., assignor, by mesne assignments, to Westinghouse Air Brake Company, Pittsburgh, Pa., a corporation of Pennsylvania
Filed Sept. 21, 1959, Ser. No. 841,209
1 Claim. (Cl. 244—90)

This invention relates to an aileron control system for aircraft and more particularly to a trim control device acting to maintain the ailerons in trim adjusted position.

The principal object of the invention is the provision of an aileron control system for aircraft with push-pull type aileron controls and specifically an aileron trim control taking the form of a hydro-mechanical device mounted so as to rotate the aircraft control wheel to provide aileron trim.

A further object of the invention is the provision of an aileron trim control device that adds greatly to the stability of the airplane on which it is installed.

A further object of the invention is the provision of an aileron trim control device that will provide aileron trim on any of the 4-place single engine or light twin executive aircraft manufactured in the United States today.

A still further object of the invention is the provision of an aileron trim control device that is very easily overridden by the pilot.

A still further object of the invention is the provision of an aileron trim control that can be installed without modifying any part of the airplane.

A still further object of the invention is the provision of an aileron trim control that is trouble free and maintainance free and will last the life of the airplane on which it is installed.

Those skilled in the art will recognize that an aircraft wing is provided with ailerons, the movement of which has the effect of changing the lift of the wing. The aileron that moves down increases the lift and the aileron that moves up decreases the lift. In this manner the aircraft is maintained with the wing in desirable horizontal position and the aircraft is said to be in trim. Various factors influence the trim of an aircraft and it has heretofore been necessary to manually control the position of the ailerons to maintain the aircraft in trim. The present invention relates to a device which when incorporated in the aileron control system of an aircraft may be quickly and easily set by the pilot to position the ailerons in the exact positions necessary to maintain the aircraft in trim and at the same time permit the pilot to exercise manual control of the ailerons if and when desired.

The device disclosed herein is made up of a single acting spring returned hydraulic hand pump and a single acting spring returned hydraulic cylinder and a spring unit that controls the trim forces and provides the pilot with an override of the trim device. The spring unit is pre-loaded to a force greater than that imposed on it by the air loads in a maximum trim position. In flight this spring will always return the ailerons to the trim adjusted position, thus adding greatly to the stability of the airplane. The hand pump, which is the pilots control, is mounted on the instrument panel or in some other convenient location. Rotating the hand pump wheel clockwise forces oil from the hand pump through a flexible hose to the hydraulic cylinder. The cylinder extends and moves the spring unit which is attached to and moves the ailerons control member. This motion moves the ailerons providing trim. Rotating the hand pump counter clockwise allows the piston and hand pump to move toward the control knob under spring force allowing the spring in the hydraulic cylinder to move the piston forcing oil back into the hand pump. This moves the spring unit and hence the aileron control member providing a trim action opposite to that described above.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 3 is a cross sectional elevation on line 3—3 of FIGURE 2.

Figure 1:
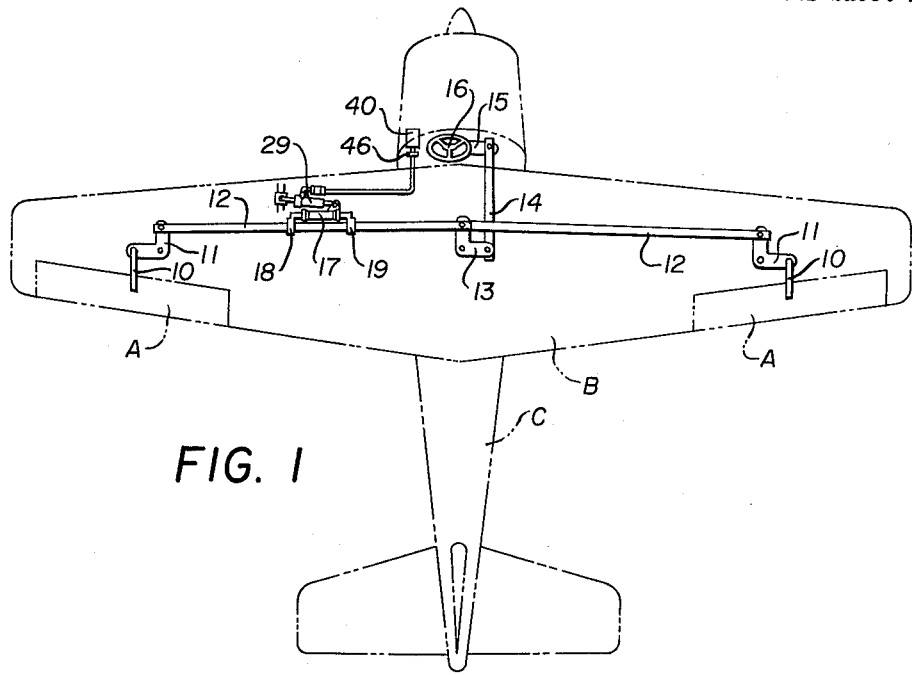
FIGURE 1 is a schematic diagram of an aircraft with push-pull type aileron controls showing the aileron trim control device installed thereon.

By referring to the drawings and FIGURE 1 in particular it will be seen that ailerons A are shown diagrammatically in a wing B of an aircraft C. The ailerons A are connected by links 10 with pivoted levers 11 which in turn are connected to the opposite ends of a push-pull tube 12. A secondary pivoted lever 13 is connected to the intermediate portion of the push-pull tube 12 and a link 14 is connected to the secondary lever and to an arm 15 which in turn extends from a control wheel shaft 16. Thus motion of the wheel shaft 16 acts to move the push-pull tube 12 longitudinally and the ailerons A move in opposite direction relative to the wing B. The levers 11 and the secondary lever 13 are pivoted to the aircraft and the ailerons A are hingedly mounted in the wing B as will be understood by those skilled in the art. In order that the position of the push-pull tube 12 may be set to effect a desired trim position of the ailerons A, a spring housing unit is secured at its opposite ends by brackets 18 and 19 to the push-pull tube 12 as shown in enlarged detail in FIGURES 2 and 3 of the drawings.

Figure 2:
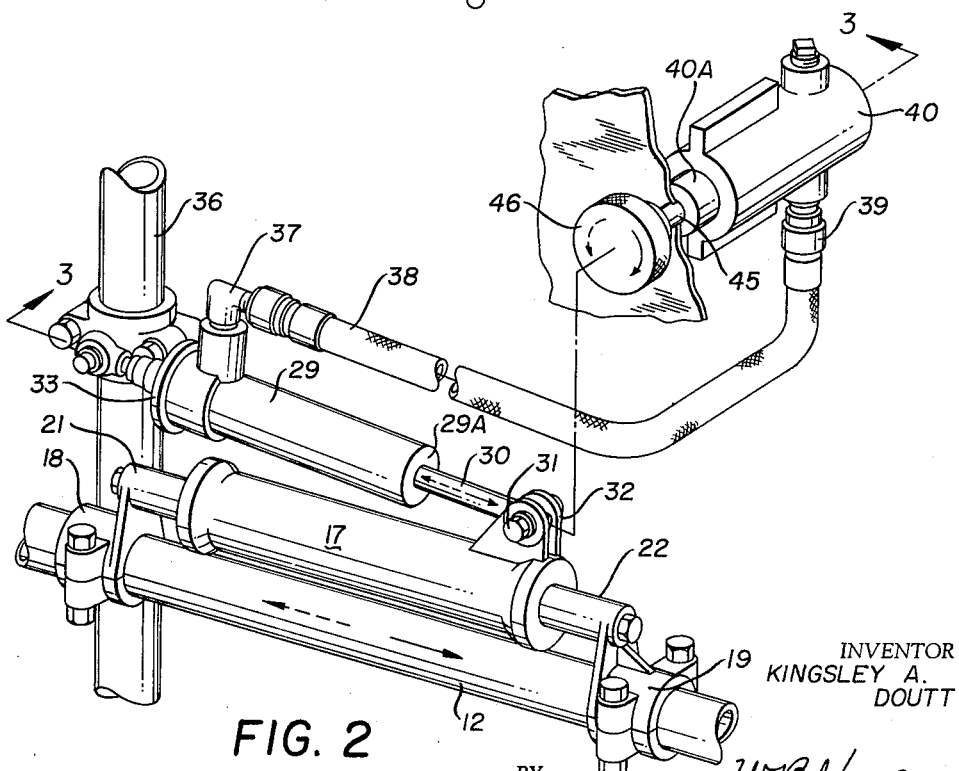
FIGURE 2 is a perspective view of the aileron trim control device.

By referring thereto it will be observed that the spring housing unit comprises a tubular body 17 having a rod 20 positioned longitudinally therethrough, the left end of the rod 20 being secured to an offset portion 21 of the bracket 18 and the right end of the rod 20 being secured to an offset portion 22 of the bracket 19. It will be observed that the tubular body member has bushings 23 and 24 disposed in its opposite ends and through which bushings 23 and 24 the rod 20 extends. The bushings 23 and 24 are prevented from moving outwardly of the tubular body 17 by snap rings 25 and 26, engaged in annular grooves in the inner wall of the tubular body 17. Thus the tubular body 17 may be moved to the right relative to the rod 20 over the offset portion 22 of the bracket 19 and it may also be moved to the left over the offset portion 21 of the bracket 18. A coil spring 27 is disposed within the tubular body 17 around the rod 20 and between the bushings 23 and 24 and the tubular body 17 is thus normally positioned as shown in FIGURES 2 and 3 of the drawings. When it is moved, for example, to the right as shown in FIGURE 3 it compresses the coil spring 27 which in turn moves against the bushing 24 and the offset end 22 of the bracket 19 and hence moves the push-pull tube 12 to the right. Movement in the opposite direction, that is to the left, as shown in FIGURE 3 has the opposite action resulting in the movement of the push-pull tube 12 to the left. It will thus be seen that the spring housing unit comprises in effect a spring loaded flexible link connecting the push-pull tube 12 of the aileron control system with a hydraulic piston and cylinder by means of which motion may be imparted to the tubular body.

The hydraulic piston and cylinder are indicated in the drawings by the numerals 28 and 29 respectively with a piston rod 30 extending from the piston 28 outwardly of the cylinder 29 and pivoted by a pivot 31 to an upstanding bracket 32 on the tubular body 17. The hydraulic cylinder 29 is capped at one end by a cap 33 which in turn is engaged upon a structural support 34 which is adjustable longitudinally and connected at its outermost end to a bracket 35 which is secured to a stationary structural member 36 of the aircraft. A fitting 37 communicates with the hydraulic cylinder 29 and with a flexible hose 38 which is of the type capable of withstanding relative high pressures without distortion and the other end of the flexible hose 38 is connected to a fitting 39 which in turn communicates with the interior of a hand pump 40. The hydraulic cylinder 29 and the piston 28 therein are spring loaded by a coil spring 41 which extends between the piston 28 around the piston rod 30 and engages the apertured end 29A of the hydraulic cylinder 29. The hand pump 40 comprises a cylindrical member having an apertured end 40A and a plug 42 in its opposite end with a piston 43 positioned therebetween. The piston 43 is spring loaded by a coil spring 44 and the apertured end 40A of the cylinder is threaded to receive a threaded rod 45 which is provided with a knurled wheel 46. The inner end of the threaded rod 45 engages the piston 43 so that by rotating the wheel 46 the piston 43 moves fluid in the pump 40 through the fitting 39, the hose 38 and into the hydraulic cylinder 29 where it causes similar movement of the piston 28 and hence the tubular body 17 as heretofore described.

It will thus be seen that since the hydraulic cylinder 29 is secured at its one end to a stationary structural portion 36 of the aircraft the resulting action is to move the rod 20 and the offset end portions 21 and 22 of the brackets 18 and 19 and therefore impart movement to the push-pull tube 12. The mounting of the aileron trim control device on the push-pull tube 12 of the regular aileron controls of the aircraft does not interfere with the manual operation thereof for the reason that manual rotation of the wheeled shaft 16 which is the control wheel of the aircraft imparts longitudinal movement to the push-pull tube 12 as heretofore described and results in relative motion of the rod 20 with respect to the tubular body 17 at which time the coil spring 27 is compressed. When the wheeled shaft 16 is allowed to return to neutral position, the neutral position achieved comprises that previously determined by the aileron trim control device herein disclosed due to the stored energy in the coil spring 27.

It will thus be seen that a pilot in an aircraft equipped with the aileron trim control disclosed herein may quickly and easily trim the aircraft by rotating the wheel 46 clockwise or counterclockwise to effect the desired positioning of the ailerons A as shown in FIGURE 1 and to maintain the aircraft wing B on its desired horizontal plane. From that time on assuming the conditions inherent in the aircraft remain unchanged the aircraft will remain in trim and at such times as the conditions alter as, for example, by the use of all of the fuel from one of the wing tanks and affecting the balance of the plane and hence the trim, a simple readjustment of the wheel 46 will again bring the aircraft to proper trim. Those skilled in the art will observe that the pilot is relieved of the heretofore believed necessary continuous manual control of the ailerons to maintain such trim and that despite the presence of the aileron trim control device the pilot still has full operating control of the ailerons by simply moving the control wheel and overriding the trim control device.

It will thus be seen that the aileron trim control disclosed therein meets the several objects of the invention and having thus described my invention, what I claim is:

An aileron trim control device for an aircraft having ailerons and a movable control member interconnecting the same, said device comprising in combination a single acting spring loaded hydraulic piston and cylinder assembly having a rod extending longitudinally thereof through an end of said cylinder for moving said piston, means on said cylinder and rod for securing said rod in desired position relative to said cylinder, a secondary single acting spring loaded hydraulic piston and cylinder assembly and tubular means establishing communication between said first mentioned and said second mentioned hydraulic piston and cylinder assemblies, said piston in said secondary hydraulic piston and said cylinder assembly having a piston rod extending outwardly of one end of said secondary hydraulic piston and cylinder assembly and structure on the opposite end of said secondary hydraulic piston and cylinder assembly securing the same to said aircraft, an enlongated member secured at its ends to said control member of said aircraft and a tubular body through which said elongated member is positioned, movable structures in the ends of said tubular body engaging enlarged end portions on said elongated member and a coil spring disposed around said elongated member within said tubular body and engaged against said movable structures, structural members in the ends of said tubular body limiting the outward movement of said movable structures and a structural extension of said tubular body pivotally secured to said piston rod of said secondary hydraulic piston and cylinder.

References Cited in the file of this patent
UNITED STATES PATENTS

| | | |
|---|---|---|
| Re. 6,365 | Fairbairn | Apr. 6, 1875 |
| 1,806,136 | Weiss | May 19, 1931 |
| 1,976,479 | Butler | Oct. 9, 1934 |
| 2,344,299 | Groves | Mar. 14, 1944 |
| 2,639,108 | Feeney et al. | May 19, 1953 |

FOREIGN PATENTS

| | | |
|---|---|---|
| 876,848 | France | Aug. 17, 1942 |